United States Patent
Halcrow et al.

(10) Patent No.: US 8,131,746 B2
(45) Date of Patent: Mar. 6, 2012

(54) DYNAMIC LANGUAGE CHECKING

(75) Inventors: Michael A. Halcrow, Pflugerville, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1650 days.

(21) Appl. No.: 11/165,448

(22) Filed: Jun. 23, 2005

(65) Prior Publication Data

US 2006/0294067 A1    Dec. 28, 2006

(51) Int. Cl.
*G06F 17/30* (2006.01)
(52) U.S. Cl. .......................... 707/769; 707/765
(58) Field of Classification Search ............ 707/3–5
See application file for complete search history.

(56) References Cited

U.S. PATENT DOCUMENTS

| | | | |
|---|---|---|---|
| 6,012,075 A * | 1/2000 | Fein et al. | 715/540 |
| 6,349,295 B1 * | 2/2002 | Tedesco et al. | 707/3 |
| 7,149,970 B1 * | 12/2006 | Pratley et al. | 715/257 |
| 2004/0205672 A1 | 10/2004 | Bates et al. | |
| 2004/0249795 A1 * | 12/2004 | Brockway et al. | 707/3 |
| 2006/0023945 A1 * | 2/2006 | King et al. | 382/173 |

FOREIGN PATENT DOCUMENTS

GB        2 345 771 A    7/2000

OTHER PUBLICATIONS

U.S. Appl. No. 10/996,321, filed Nov. 22, 2004, Hamzy.

* cited by examiner

*Primary Examiner* — Shyue Jiunn Hwa
(74) *Attorney, Agent, or Firm* — DeLizio Gilliam, PLLC (57) ABSTRACT

Methods, systems, and computer program products are disclosed for dynamic language checking. Embodiments include identifying questionable language usage; creating a query in dependence upon the questionable language usage; querying a search engine with the query; receiving from the search engine search result statistics describing the search results for the query; and determining, in dependence upon search results statistics returned by the search engine, whether the questionable language usage is proper language usage.

4 Claims, 5 Drawing Sheets

DYNAMIC LANGUAGE CHECKING

BACKGROUND OF THE INVENTION

1. Field of the Invention

The field of the invention is data processing, or, more specifically, methods, systems, and products for evaluating language usage in an application that supports language checking.

2. Description of Related Art

Many conventional applications support language usage checking of the content of documents created with the application. Such language checking includes spell checking and grammar checking. Examples of applications that support language checking include word processing applications, spreadsheet applications, email applications, and many others as will occur to those of skill in the art. Despite the fact that the language usage being checked by these applications is evolving, the language checking functions are static. The quality of the language checking of an application is dependent upon the frequency with which the language checking function of the application functions is updated. If a properly-used-newly-coined word or phrase is not found in a spell checker's vocabulary or a grammar checker's phrase bank, the word or phrase is typically flagged as being misused. There is an ongoing need for improvement in language checking in applications which is not constrained by the dynamic evolution of language usage.

SUMMARY OF THE INVENTION

Methods, systems, and computer program products are disclosed for dynamic language checking. Embodiments include identifying questionable language usage; creating a query in dependence upon the questionable language usage; querying a search engine with the query; receiving from the search engine search result statistics describing the search results for the query; and determining, in dependence upon search results statistics returned by the search engine, whether the questionable language usage is proper language usage.

Creating a query in dependence upon the questionable language usage may be carried out by using the identified questionable language usage as a query. Creating a query in dependence upon the questionable language usage may be carried out by identifying suggested language usage in dependence upon the questionable language usage and creating a query in dependence upon the suggested language usage. Creating a query in dependence upon the suggested language usage may be carried out by substituting at least one word of the questionable language usage with at least one word of the suggested language usage.

Typical embodiments also include determining, in dependence upon search result statistics returned by the search engine, proper language usage by receiving a plurality of search result statistics for a plurality of queries created in dependence upon the questionable language usage, and identifying one of the plurality of queries as the proper language usage in dependence upon the search result statistics and statistics evaluation rules. Typical embodiments also include determining whether the proper language usage is the same as the questionable language usage and suggesting the proper language usage to a user if the proper language usage is not the same as the questionable language usage.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for language checking. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Dynamic Language Checking

Figure 1:
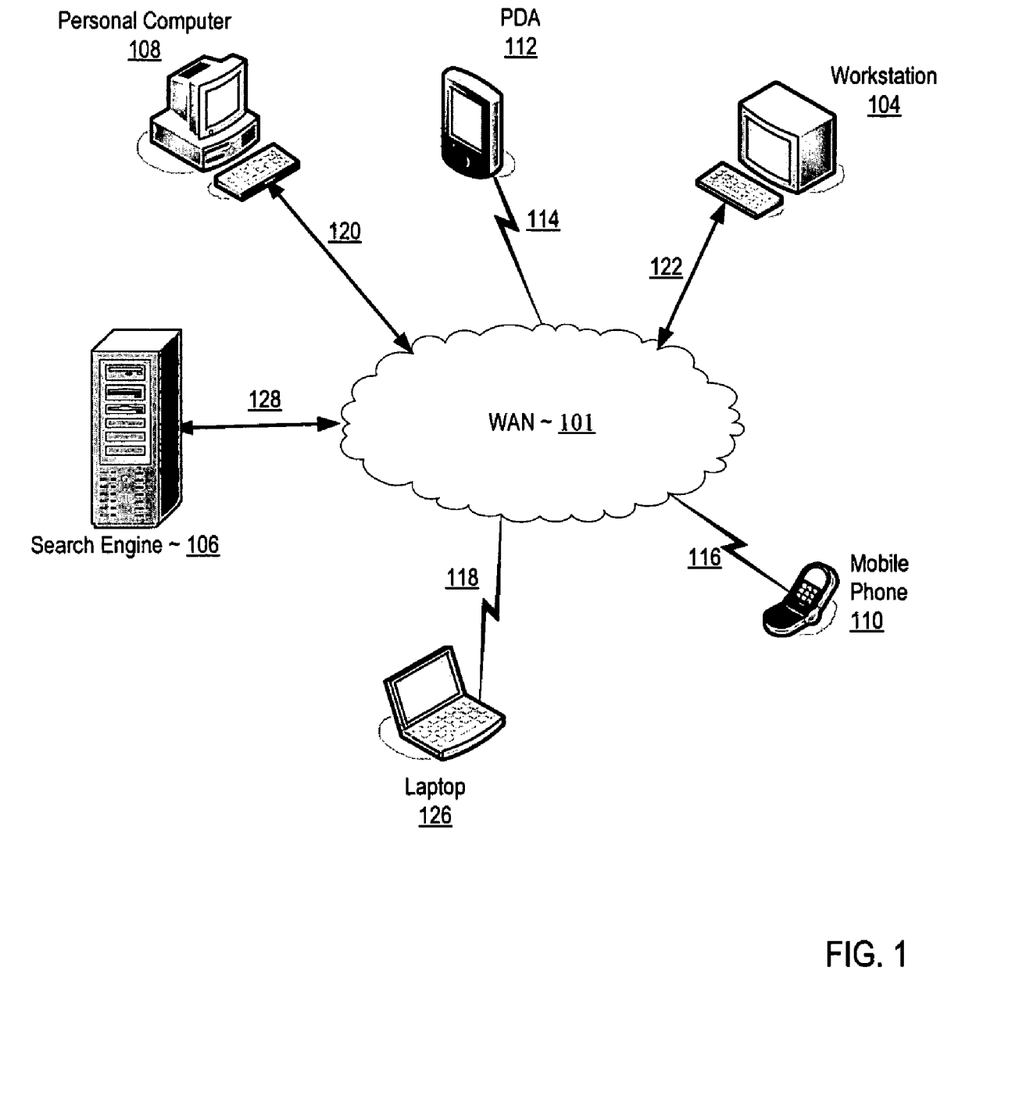
FIG. 1 sets forth a network diagram illustrating an exemplary system of computers each of which may have installed upon it an application modified to support dynamic language checking according to embodiments of the present invention.

Exemplary methods, systems, and products for language checking are described with reference to the accompanying drawings, beginning with FIG. 1. FIG. 1 sets forth a network diagram illustrating an exemplary system of computers each of which may have installed upon it an application modified to support dynamic language checking according to embodiments of the present invention. Examples of applications that currently support language checking and may be modified to support dynamic language checking include word processing applications, spreadsheet applications, email applications, and many others as will occur to those of skill in the art.

The data processing system of FIG. 1 includes wide area network ("WAN"). The network connection aspect of the architecture of FIG. 1 is only for explanation, not for limitation. In fact, systems for language checking may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary devices including a PDA (112), a computer workstation (104), a mobile phone (110), a laptop (126), a server supporting a search engine (106) and personal computer (108) are connected to the WAN (101). Network-enabled mobile phone (110) connects to the WAN (101) through a wireless link (116), the laptop (126) connects to the WAN (101) through a wireless link (118), and the PDA (112) connects to the network (101) through a wireless link (114). In the example of FIG. 1, the personal computer (108) connects to the WAN (101) through a wireline connection (120), the computer workstation (104) connects to the WAN (101) through a wireline connection (122), and the server supporting a search engine (106) connects to the WAN (101) through a wireline (128) connection.

In the system of FIG. 1, the exemplary devices (108, 112, 104, 110, and 126) have installed upon them an application modified to support dynamic language checking according to embodiments of the present invention. Conventional applications supporting language checking may be modified through for example a plug-in designed to extend the language checking capabilities of the application according to embodiments of the present invention. Applications so modified are capable of identifying questionable language usage; creating a query in dependence upon the questionable language usage; querying a search engine (106) with the query; receiving from the search engine (106) search result statistics describing the search results for the query; and determining, in dependence upon search results statistics returned by the search engine (106), whether the questionable language usage is proper usage.

Search result statistics are data that describe the results returned from a particular search query. The search result statistics are not the search results themselves but statistics describing the search results. A common example of search result statistics is a raw number of pages returned by the search engine for a particular query. Often such search results statistics are provided in a predetermined location in the results page returned by a search engine.

In one straightforward example of dynamic language checking, the questionable language is used as a query without modification. In such an example, if search result statistics returned from the search engine demonstrate that the questionable language is found in at least a predetermined number of web pages, and therefore sufficiently used, then the questionable language is determined to be proper language usage. If search result statistics returned from the search engine, demonstrate that the questionable language is not found in at least a predetermined number of web pages, and therefore not sufficiently used, then the questionable language is determined to be improper language usage. Such a straightforward example of dynamic language checking confirms or denies the use of questionable language by relying on language usage in web pages to demonstrate proper usage. Dynamic language checking takes advantage of the fact that newly coined words and phrases often appear in web pages already indexed by search engines well before being incorporated in the vocabularies of conventional spell checkers or the phrase banks of conventional grammar checkers.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Language checking in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in language checking according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Figure 2:
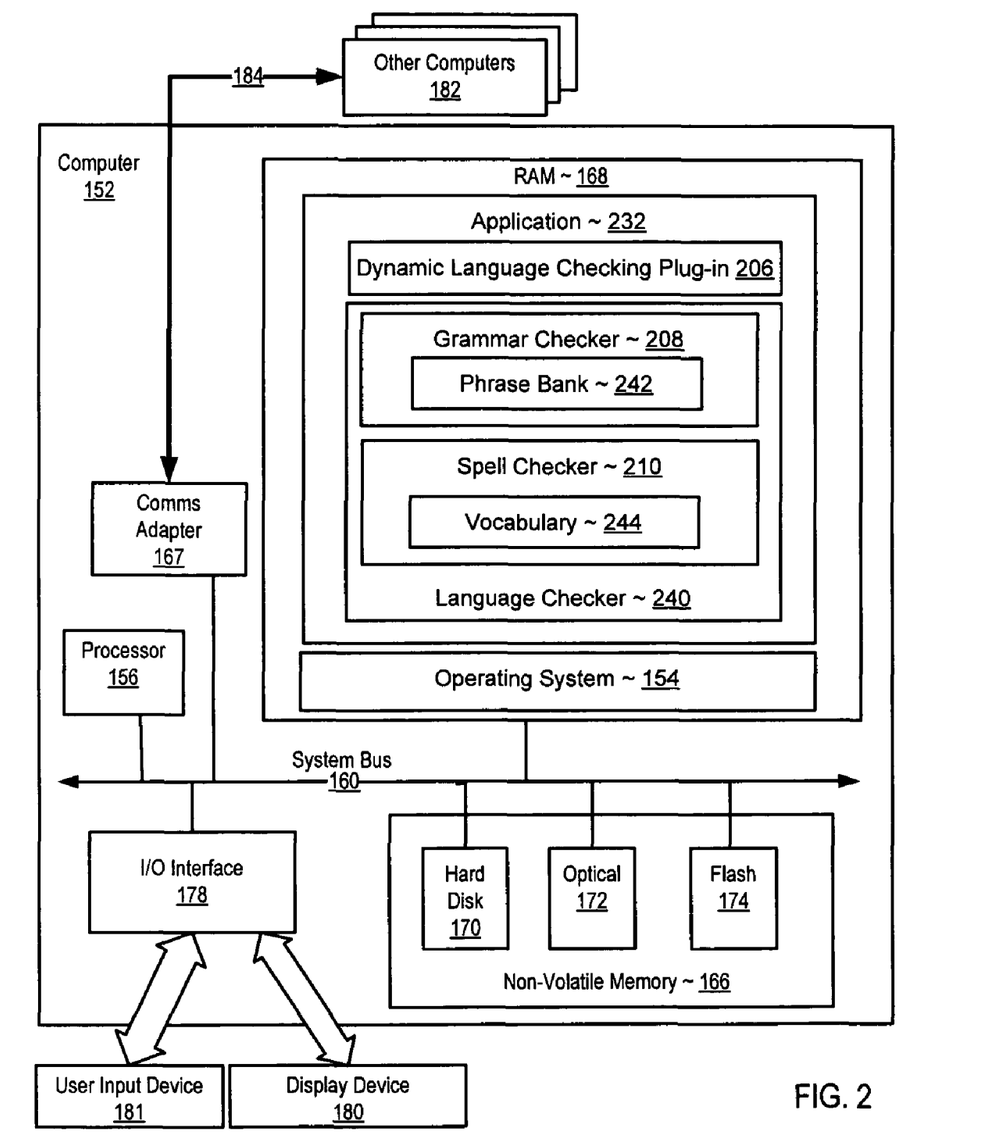
FIG. 2 sets forth a block diagram of automated computing machinery comprising an exemplary computer useful in language checking according to embodiments of the present invention.

Stored in RAM (168) is an application that supports language checking. Examples of applications that support language checking include word processing applications, spreadsheet applications, email applications and many others as will occur to those of skill in the art. The exemplary application (232) includes a language checker (240) that in turn includes a grammar checker (208) and a spell checker (210). The grammar checker (208) identifies questionable language usage by comparing the language usage in a document with a phrase bank (242). If the phrase is not found in the phrase bank, the grammar checker flags the language usage as questionable. Often grammar checkers (208) also employ language models to more accurately evaluate grammar. The exemplary spell checker (210) of FIG. 1 identifies questionable language usage in a document by comparing the words of the usage to a vocabulary (244). The spell checker (210) then flags as questionable any word not contained in the vocabulary (244).

The exemplary application (232) of FIG. 2 has been modified by the installation of a dynamic language checking plug-in (206). The dynamic language checking plug-in operates generally by identifying questionable language usage; creating a query in dependence upon the questionable language usage; querying a search engine with the query; receiving from the search engine search result statistics describing the search results for the query; and determining, in dependence upon search results statistics returned by the search engine, whether the questionable language usage is proper usage.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. Operating system (54), application (232), and dynamic language checking plug-in (206) in the example of FIG. 2 are shown in RAM (168), but many components of such software typically are stored in non-volatile memory (166) also.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for language checking according to embodiments of the present invention include modems for wired dial-up communications, Ethernet (IEEE 802.3) adapters for wired network communications, and 802.11b adapters for wireless network communications.

Figure 3:
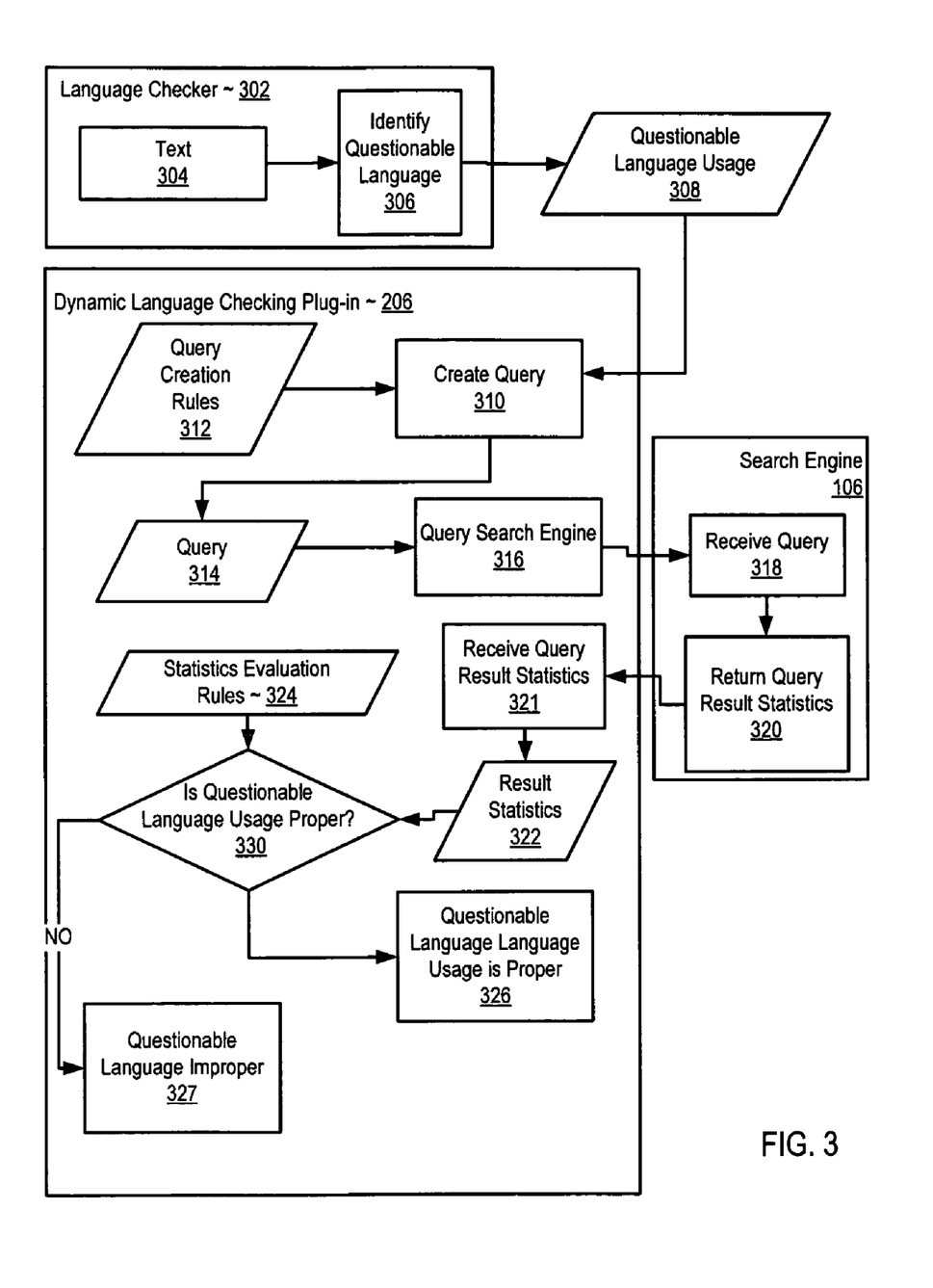
FIG. 3 sets forth a flow chart illustrating an exemplary computer implemented method for dynamic language checking.

For further explanation, FIG. 3 sets forth a flow chart illustrating an exemplary computer implemented method for dynamic language checking. As discussed above, many applications currently support language checking, such as word processing applications, spreadsheet applications, email applications and so on as will occur to those of skill in the art. All such applications are capable of modification, through for example a plug-in, to include the capability of dynamic language checking according to embodiments of the present invention.

The method of FIG. 3 includes identifying (306) questionable language usage (308). In the method of FIG. 3 identifying (306) questionable language usage (308) is carried out by a language checker such as a spelling checker or a grammar checker. As discussed above, grammar checkers typically identify questionable language usage by comparing the text (304) of the language usage with a phrase bank. If the phrase is not found in the phrase bank, the grammar checker identifies the language usage as questionable. Often grammar checkers also employ language models to more accurately evaluate phrases. Spell checkers often identify questionable language usage by comparing the text of the language to a vocabulary. If a word is not found in the vocabulary, then the spell checker identifies the word as questionable language usage (308).

The method of FIG. 3 also includes creating (310) a search engine query (314) in dependence upon the questionable language usage (308) and querying (316) a search engine (106) with the query (314). One straightforward way of creating a query in dependence upon the questionable language usage is carried out by using the identified questionable language usage as a query without further modification.

Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases. Results of such queries do not necessarily reside in files, but they are nevertheless data resources identified by URLs and identified by a search engine and query data that produce such resources. An example of URL encoded data is:

http://www.example.com/
search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

The method of FIG. 3 also includes returning (320), by the search engine (106) search result statistics. Search result statistics are data that describe the results returned from a particular search query. The search result statistics are not the search results themselves but statistics describing the search results. A common example of search result statistics is a raw number of pages returned by the search engine for the query. Often such search results statistics are provided in a predetermined location in the results page returned by a search engine.

The method of FIG. 3 also includes receiving (321) from the search engine (106) search result statistics (322) describing the search results for the query (314) and determining (326), in dependence upon search results statistics (322) returned by the search engine (106), whether the questionable language usage is proper usage. In the example of FIG. 3, determining (326) whether the questionable language usage is proper is carried out in dependence upon statistics evaluation rules. Statistics evaluation rules (324) are rules designed to identify proper language usage in dependence upon search result statistics for one or more queries created in dependence upon questionable language. One simple statistics evaluation rule is a predetermined threshold of web pages that must contain the questionable language usage to confirm that the questionable usage is in fact proper usage. Consider the following statistics evaluation rule.

---

IF query = questionable language; AND
results statistics include over 1,000,000 web pages; THEN
proper language usage = questionable language.

---

In the example above, if a query including the questionable language submitted in unmodified form to a search engine returns over 1,000,000 web pages then the questionable language is determined to be properly used. The fact that the questionable language usage has been found in over 1,000,000 web pages provides enough basis to conclude that the questionable language has been used properly.

Consider the following exemplary use case. An application supporting dynamic language checking according to embodiments of the present invention identifies the phrase "in that vein" as questionable language and queries a search engine with the phrase. The search result statistics returned by the search engine demonstrate that the phrase is found in 49,100 web pages. A statistics evaluation rule dictates that phrases found in over 25,000 web pages are determined to be properly used. An application supporting dynamic language checking therefore determines that the questionable phrase "in that vein" is properly used. Similarly, when the same application identifies the phrase "in that vain" as questionable language and queries a search engine with the phrase. The search result statistics returned by the search engine demonstrate that the phrase is found in only 1,520 web pages. Using the same statistics evaluation rule, an application supporting dynamic language checking determines that the questionable phrase "in that vain" is improperly used.

The example of FIG. 3 confirms whether the questionable language is properly used or determines that the questionable language is not properly used (327). Dynamic language checking according to embodiments of the present invention may also use search result statistics to perform more analysis on questionable language usage to determine proper language usage in dependence upon the identified questionable language usage. For further explanation, FIG. 4 sets forth a flow chart illustrating an exemplary method of dynamic language checking that includes identifying (306) questionable language usage (308). As discussed above, grammar checkers typically identify questionable language usage by comparing the text (304) of the language usage with a phrase bank. If the phrase is not found in the phrase bank, the grammar checker identifies the language usage as questionable. Often grammar checkers also employ language models to more accurately evaluate grammar. Spell checkers often identify questionable language usage by comparing the text of the language to a vocabulary. If a word is not found in the vocabulary, then the spell checker identifies the word as questionable language usage (308).

Figure 4:
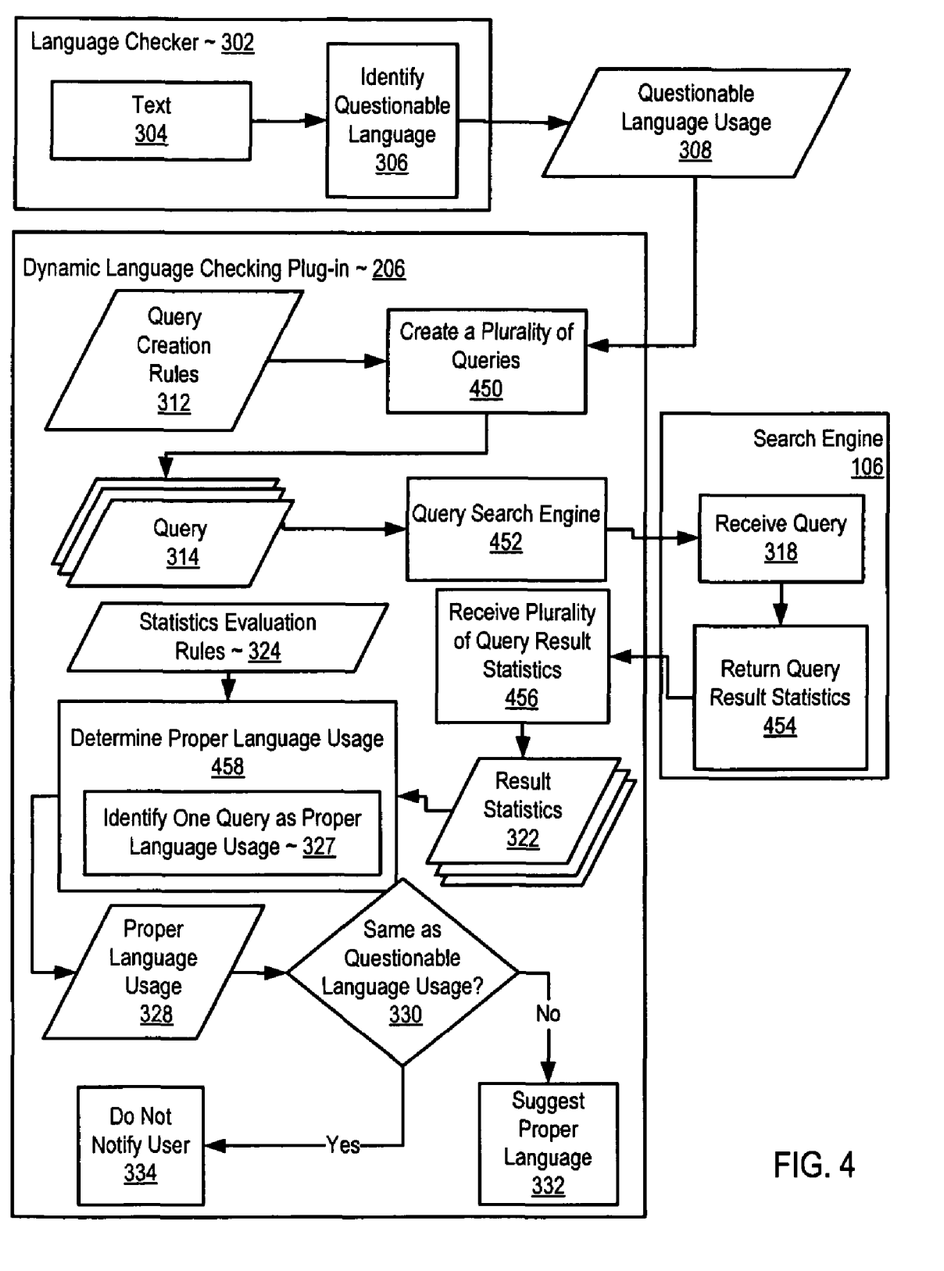
FIG. 4 sets forth a flow chart illustrating another exemplary method of dynamic language checking.
Figure 5:
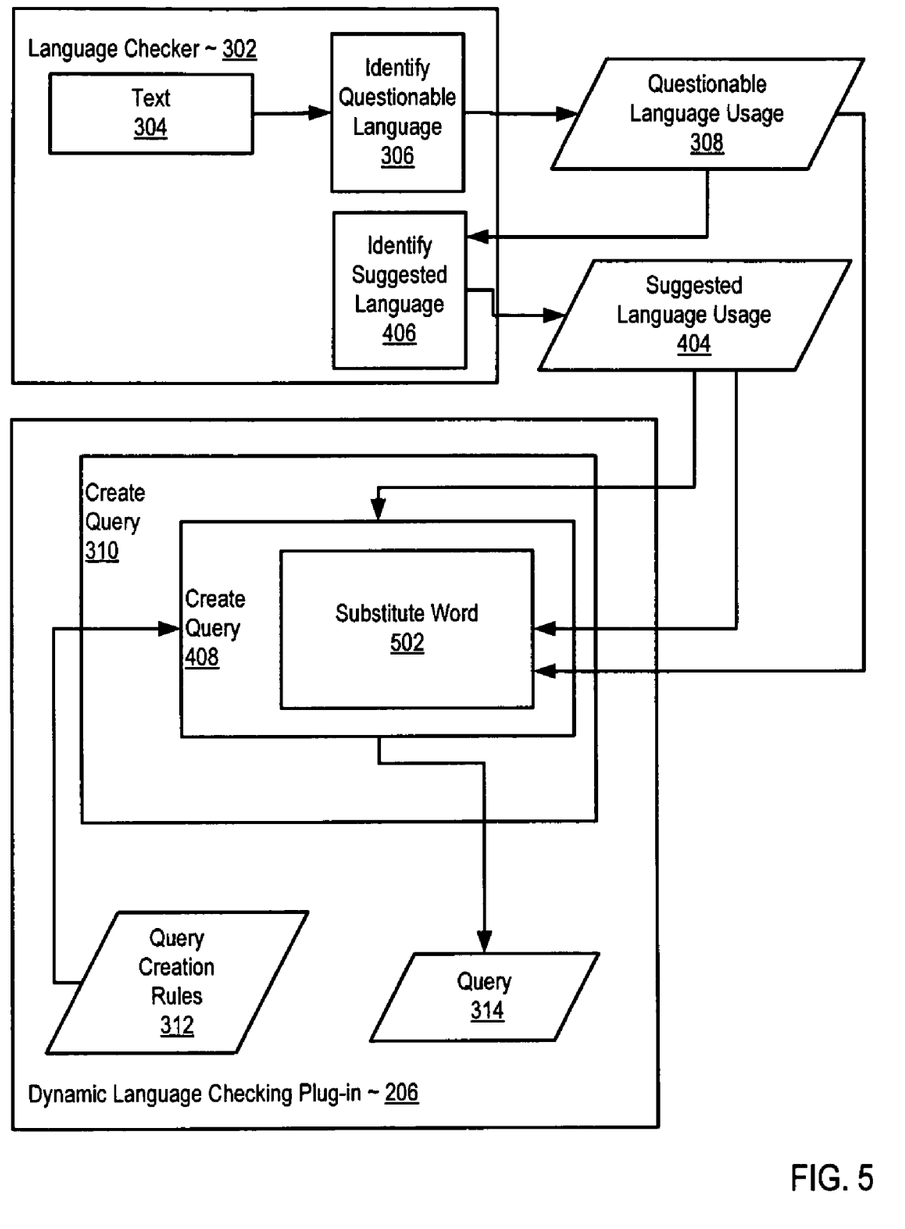
FIG. 5 sets forth a flow chart illustrating an exemplary method for creating one of a plurality queries in dependence upon the questionable language usage.

The method of FIG. 4 also includes creating (450) a plurality of a queries (314) in dependence upon the questionable language usage (308). For further explanation, FIG. 5 sets forth a flow chart illustrating an exemplary method for creating (310) one of a plurality queries (314) in dependence upon the questionable language usage (308). The example of FIG. 5 includes identifying (306) questionable language and identifying (406) suggested language usage (404) in dependence upon the questionable language usage (306). Conventional language checkers also often provide suggested language usage in response to identifying questionable language usage. In the example of FIG. 5, identifying (406) suggested language usage (404) is carried out by a language checker (302) and provided to a dynamic language checking plug-in (206) operating according to embodiments of the present invention.

The method of FIG. 5 includes creating (408) a query (314) in dependence upon the suggested language usage (404) according to query creation rules (312). Query creation rules (312) are rules governing a query creation in dependence upon a suggested language usage. One way of creating (408) a query (314) in dependence upon the suggested language usage (404) in dependence upon query creation rules (312) includes substituting (502) at least one word of the questionable language usage (308) with at least one word of the suggested language usage (404). Consider the following example. An application supporting dynamic language checking identifies the word "Linux" as questionable in the sentence "I like the Linux operating system." Suggested language identified by a language checker for the word "Linux" include "Line," "Linea," "Lined," "Linen." Substituting at least one word of the questionable language usage (308) with at least one word of the suggested language usage (404) yields the following possible queries: "I like the Line operating system," "I like the Linea operating system," "I like the Lined operating system," and "I like the Linen operating system."

Creating (408) a query (314) in dependence upon the suggested language usage (404) by substituting (502) at least one word of the questionable language usage (308) with at least one word of the suggested language usage (404) according to query creation rules may also include rules determining which words before or after questionable language to use in the query. Continuing with the same example, a dynamic language checking plug-in creates for the suggested word "line" three queries from the questionable language usage "I like the Linux operating system." In a first query Linux is substituted with Line and two words after Linux are maintained in the query yielding "Line operating system." In a second query Linux is substituted with Line and two words before Linux are maintained in the query yielding "like the Line." In a third query Linux is substituted with Line and one word before Linux and one word after Linux are maintained in the query yielding "Line operating system."

The example queries discussed above are for explanation and not for limitation. Query creation rules (312) provide a vehicle to create queries in dependence upon suggested language usage in many ways and all such ways are well within the scope of the present invention.

Again with reference to FIG. 4: After identifying (306) questionable language usage (308) and creating (450) a plurality of a queries (314) in dependence upon the questionable language usage (308). The method of FIG. 4 includes querying (452) a search engine (106) with the queries (314) and receiving (456) from the search engine search result statistics (322) returned by the search engine describing the search results for each of the queries (314).

The method of FIG. 4 also includes determining (458), in dependence upon search results statistics (322) returned by the search engine (106), proper language usage (328). One way of determining (458), in dependence upon search results statistics (322) returned by the search engine (106), proper language usage (328) is carried out by identifying (327) one query as the proper language usage. Typically, the query found in the most web pages is identified as proper language usage.

For further explanation consider the following use case. An application supporting dynamic language checking identifies the word "Linux" as questionable in the sentence "I like the Linux operating system." Suggested language identified by a language checker for the word "Linux" include "Line," "Linea," "Lined," "Linen." Three queries are created for each suggested word by substituted Linux with the suggested word and maintaining two other words in each the query; two before Linux, two after Linux, and one before Linux and one after Linux. Three additional queries are also created without substituting Linux, yet maintaining two other words in each the query; two before Linux, two after Linux, and one before Linux and one after Linux. All the queries are then submitted to a search engine and the search result statistics for each query are used to determine the proper language usage. The search result statistics returned for each query are:

| | |
|---|---|
| "Line operating system" | (941 web pages) |
| "the Line operating" | (1,010 web pages) |
| "like the Line" | (16,700 web pages) |
| "Linea operating system" | (2 web pages) |
| "the Linea operating" | (1 web pages) |
| "like the Linea" | (7 web pages) |
| "Lined operating system" | (2 web pages) |
| "the Lined operating" | (2 web pages) |
| "like the Lined" | (206 web pages) |
| "Linen operating system" | (1 web pages) |
| "the Linen operating" | (0 web pages) |
| "like the Linen" | (451 web pages) |
| "Linux operating system" | (635,000 web pages) |
| "the Linux operating" | (287,000 web pages) |
| "like the Linux" | (11,800 web pages) |

In this example proper language usage is identified by selecting the word whose usage among a plurality of queries is the greatest. The results of the three are added giving a total number of web pages containing the word in the queries yielding.

| | |
|---|---|
| Linux | (933, 800) |
| Line | (18, 651) |
| Linea | (10) |
| Lined | (210) |
| Linen | (452) |

In this example, the search result statistic indicate that the word "Linux" in context was found in the most web pages and is therefore determined to be proper language usage. In this example, the questionable language usage is determined to be proper usage.

Because questionable language usage may be properly used, the method of FIG. 4 includes determining (330) whether the proper language usage (328) is the same as the questionable language usage (306). If the proper language usage (328) is the same as the questionable language usage (306), then the method of FIG. 4 does not notify the user of the questionable language. When the questionable language is in fact proper, the method of FIG. 4 operates transparently to a user. If the proper language usage (328) is the same as the questionable language usage (306), the method of FIG. 4 includes suggesting (332) the proper language usage (328) to a user if the proper language usage is not the same as the questionable language usage.

After determining proper language usage according to the method of FIG. 4, an application supporting dynamic language checking may save the proper language usage in a vocabulary or phrase bank available to a language checker. Saving the proper language usage prevents repeated checking of the same phrases.

Exemplary embodiments of the present invention are described largely in the context of a fully functional computer system for evaluating language usage in an application that supports language checking. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for dynamic language checking, the method comprising:
    identifying a questionable language usage;
    creating a query in dependence upon the questionable language usage including identifying suggested language usage in dependence upon the questionable language usage and substituting at least one word of the questionable language usage with at least one word of the suggested language usage;
    querying a search engine with the query;
    receiving from the search engine search result statistics describing search results for the query; and
    determining, in dependence upon search results statistics returned by the search engine, whether the questionable language usage is proper language usage.

2. The method of claim 1 wherein creating a query in dependence upon the questionable language usage further comprises using the identified questionable language usage as a query.

3. The method of claim 1 further comprising determining, in dependence upon search result statistics returned by the search engine, proper language usage, including:
    receiving a plurality of search result statistics for a plurality of queries created in dependence upon the questionable language usage; and
    identifying one of the plurality of queries as the proper language usage in dependence upon the search result statistics and statistics evaluation rules.

4. The method of claim 3 further comprising:
    determining whether the proper language usage is the same as the questionable language usage; and
    suggesting the proper language usage to a user if the proper language usage is not the same as the questionable language usage.

* * * * *